United States Patent
Guerry et al.

(10) Patent No.: US 9,345,998 B2
(45) Date of Patent: May 24, 2016

(54) METHOD AND DEVICE FOR THE DECANTATION OF OIL CONTAINED IN A GAS STREAM

(71) Applicant: MGI COUTIER, Champfromier (FR)

(72) Inventors: Pascal Guerry, Seppois-le-Haut (FR); Patrick Barbe, Lons le Saunier (FR)

(73) Assignee: MGI COUTIER, Champfromier (FR)

( * ) Notice: Subject to any disclaimer, the term of this patent is extended or adjusted under 35 U.S.C. 154(b) by 84 days.

(21) Appl. No.: 14/352,909

(22) PCT Filed: Oct. 26, 2012

(86) PCT No.: PCT/FR2012/052465
§ 371 (c)(1),
(2) Date: Apr. 18, 2014

(87) PCT Pub. No.: WO2013/060998
PCT Pub. Date: May 2, 2013

(65) Prior Publication Data
US 2014/0283689 A1 Sep. 25, 2014

(30) Foreign Application Priority Data
Oct. 27, 2011 (FR) ...................................... 11 59754

(51) Int. Cl.
*B01D 45/16* (2006.01)
*B01D 45/08* (2006.01)
(Continued)

(52) U.S. Cl.
CPC ............... *B01D 45/16* (2013.01); *B01D 45/08* (2013.01); *B01D 45/12* (2013.01);
(Continued)

(58) Field of Classification Search
CPC ........ B01D 45/00; B01D 45/08; F01M 13/04; F01M 2013/0438; F02M 25/06; F02F 7/006; Y02T 10/121
USPC .......... 55/322, 446; 123/41.86, 543, 572, 573
See application file for complete search history.

(56) References Cited

U.S. PATENT DOCUMENTS 3,266,474 A * 8/1966 Crandall ............... F01M 13/023
123/543
3,326,198 A * 6/1967 Jackson ................. F01M 13/04
123/572

(Continued)

FOREIGN PATENT DOCUMENTS

| CN | 1910362 A | 2/2007 |
|---|---|---|
| DE | 101 59 157 A1 | 6/2003 |

(Continued)

OTHER PUBLICATIONS

Feb. 6, 2013 International Search Report issued in International Application No. PCT/FR2012/052465.
(Continued)

*Primary Examiner* — Duane Smith
*Assistant Examiner* — Minh-Chau Pham
(74) *Attorney, Agent, or Firm* — Oliff PLC (57) ABSTRACT

In this process, a gas stream containing the oil to be separated is circulated between an inlet zone and an outlet zone, and a calm vacuum zone is created where the oil is recovered and evacuated, after having been captured. According to the invention, the gas stream is passed in contact with a porous media, one face of which is in contact with the calm vacuum zone. The drops of oil are thus captured by the porous media and sucked through this media to arrive in the calm zone. This process is applicable to decanters of oil at impacters and also to cyclone separators, in particular in the automotive field.

17 Claims, 5 Drawing Sheets

(51) Int. Cl.
   *B01D 45/12* (2006.01)
   *B01D 46/00* (2006.01)
   *B01D 46/10* (2006.01)
   *B01D 50/00* (2006.01)
   *B04C 5/14* (2006.01)
   *F01M 13/04* (2006.01)
   *B04C 5/10* (2006.01)

(52) U.S. Cl.
   CPC ........... *B01D 46/0031* (2013.01); *B01D 46/10* (2013.01); *B01D 46/106* (2013.01); *B01D 50/002* (2013.01); *B04C 5/10* (2013.01); *B04C 5/14* (2013.01); *F01M 13/04* (2013.01); *B01D 2275/202* (2013.01); *B01D 2275/30* (2013.01); *F01M 2013/0427* (2013.01); *F01M 2013/0438* (2013.01)

(56) References Cited

U.S. PATENT DOCUMENTS

| | | | | |
|---|---|---|---|---|
| 3,875,916 | A | * | 4/1975 | Patton ..................... F01M 13/00 123/41.86 |
| 4,269,607 | A | * | 5/1981 | Walker ................... B01D 45/00 123/573 |
| 4,283,209 | A | * | 8/1981 | Schmalhofer .......... B01D 45/08 126/229 D |
| 4,627,406 | A | * | 12/1986 | Namiki ................... F01M 13/04 123/572 |
| 4,920,930 | A | * | 5/1990 | Sakano ................... F01M 13/04 123/41.86 |
| 5,254,147 | A | * | 10/1993 | Finke ...................... A47L 9/108 15/353 |
| 5,450,835 | A | | 9/1995 | Wagner |
| 7,850,754 | B2 | | 12/2010 | Ruppel et al. |
| 2007/0062887 | A1 | | 3/2007 | Schwandt et al. |
| 2007/0295315 | A1 | | 12/2007 | Guerry et al. |
| 2011/0146639 | A1 | | 6/2011 | Martinengo et al. |

FOREIGN PATENT DOCUMENTS

| | | |
|---|---|---|
| DE | 10 2005 027 415 A1 | 12/2006 |
| DE | 10 2007 021 156 A1 | 11/2008 |
| EP | 1 795 753 A1 | 6/2007 |
| EP | 2 021 593 B1 | 10/2010 |
| FR | 2 874 646 A1 | 3/2006 |
| FR | 2 898 386 A1 | 9/2007 |
| FR | 2 922 126 A1 | 4/2009 |
| FR | 2 931 199 A1 | 11/2009 |
| WO | 2005/072369 A2 | 8/2005 |

OTHER PUBLICATIONS

Feb. 6, 2013 Written Opinion issued in International Application No. PCT/FR2012/052465.

* cited by examiner

METHOD AND DEVICE FOR THE DECANTATION OF OIL CONTAINED IN A GAS STREAM

The present invention relates to a method for decanting oil contained in a gas stream, and a device for decanting oil implementing this method. This invention applies to the field of automotive vehicles, more particularly for the recovery of the oil contained in the gases exiting the crankcase of an internal combustion engine of a vehicle.

A principle known for the separation and recovery of oil contained in a gas stream, consists in creating a calm vacuum area where the oil is collected and discharged. The vacuum allows suctioning the oil into a calm oil recovery area located for example below an impact surface or at the bottom of a cyclone separator. Thus, the undesirable phenomenon of the oil pulling-off is avoided in areas where the gas stream has a substantial speed.

Various configurations and artifices have already been proposed to create the vacuum, suction the oil and discharge this oil.

In the case of oil separators using impact surfaces, solutions for obtaining calm oil recovery areas in vacuum are described in patent documents FR 2874646, FR 2898386 and FR 2931199 in the name of the Applicant, which disclose various suction chamber and oil recovery systems.

For a cyclone separator, patent document FR 2922126 in the name of the Applicant describes a particular configuration providing a calm oil recovery area in vacuum, the oil captured on the walls being suctioned by a hole located at the base of the cyclone.

In all the aforementioned configurations, which use a principle of oil capture by inertia, the drops of oil come hitting on one or more wall(s), and capillary forces then retain the oil on the walls. In addition, under the effect of gravity and the entraining by the gas stream, the oil drops are moved on the walls. The suction created in particular by one or more suction hole(s), changes the direction of the gas stream in such a manner as to direct the flow of oil on the wall or walls towards the calm area from which the oil is discharged.

However, such an artifice has limitations. In particular, the suctioning gas stream being weak in order to limit the flow speed in the calm area, the walls located at a distance from the suction hole or holes are not sufficiently affected by this suction stream. Thus, only the main part, usually the central part of the stream is efficient, in such a manner that only a fraction of the oil is entrained downwards to the calm area, whereas the remaining oil passes by the sides of the walls and is not recovered directly.

In order to prevent this drawback, it is standard to multiply the impact surfaces, for example by providing three successive impact surfaces in an oil separator, in such a manner as to recover all the oil. Another solution consists in optimizing the shapes of the oil separator to better guide the suction stream on the walls, by controlling the intensity and direction of this stream. On the whole, for a given efficiency, these solutions require a certain volume and increase the size of oil separators, whereas size reduction is always sought in is automotive vehicles.

For the sake of improving current solutions, it has already been proposed to use a fiber-based porous material in plastic material, of "filter" type in the form of one or two layer(s) stuck to the inner wall of a cyclone separator—see European patent EP 2021593 B1. The oil drops are thus captured by passing close to the fibers; capillary forces hence, stop and retain the drops on the fibers. These drops become larger as the oil is captured, and when the weight of the drops becomes predominant, the latter will slide down the fibers, to be collected at the base of the cyclone, according to the phenomenon called "coalescence".

Although such a principle is in theory satisfactory, its practical implementation encounters various difficulties, considering that controlling the implemented phenomena is tricky.

Thus, the oil drops should already reach a certain size in order to be able to slide along the fibers, without however becoming pulled-off due to the speed. This requires large sections hence important volumes for the porous material used, with as a result an increase in the size of the cyclone separator. Yet, the usual location of the separator in a cylinder head cover of an internal combustion engine of an automotive vehicle requires having a separator of limited size.

The control of the coalescence phenomenon is also difficult due to the variations in speed. In high speed areas, a highly absorbent porous material is required as the oil tends to detach as a result of the speed. In other areas however, a highly oleophobic porous material is required, that is to say, an oil repellent in order to create large drops and discharge the oil. Hence, several types of porous material should be combined and distributed in different areas, thus, posing industrial problems, in particular complicating the manufacture of cyclone separators and thus, increasing costs.

Finally, the capillary properties of a fiber-based porous material in plastic material change over time, due in particular to the ageing of the material, caused by alternating temperatures (hot/cold cycle) and surface pollution of this material, resulting in particular from the deposit of solid particles.

Therefore, despite the advantages that are to be expected from the use of a porous material, the current implementation of such a material in a cyclone separator is not yet an ideal solution.

Hence, the object of the present invention aims to remedy to all the above-mentioned drawbacks by providing for the decantation of oil contained in a gas stream, a technical solution that is at the same time simple, compact, cost-effective and effective, without the speed having to be increased in the calm oil recovery area, this solution having a broad range of applications.

To this end, the invention relates to a method for the decantation of oil contained in a gas stream, in particular, in the field of automotive vehicles with internal combustion engine, the method providing for circulating the gas stream containing oil to be separated, between an inlet area and an outlet area, and creating a calm vacuum area in which the oil is collected and discharged, after having been captured, and this method being substantially characterized by the fact that the gas stream is passed in contact with at least one porous medium, one face of which is in communication with the calm vacuum area, in such a manner that oil drops are captured by the porous medium and are suctioned through this porous medium to arrive in said calm vacuum area.

The invention also relates to a device for the decantation of oil contained in a gaseous fluid, by implementing the method defined above, the device comprising an inlet area for the gas stream containing oil to be separated, an outlet area for the de-oiled gas, at least one intermediate area provided with means for capturing the drops of oil contained in the gas stream, and at least one calm vacuum area wherein the captured oil is collected and discharged, the putting under vacuum of said calm area being preferably achieved by a communication between this calm area and the outlet area, and this device being substantially characterized by the fact that the means for capturing the drops of oil are constituted of at least one porous medium placed at the interface between the or each intermediate area and calm vacuum area, in such a manner that the drops of oil are captured by the porous medium and suctioned through this porous medium in order to arrive in said calm vacuum area.

Thus, the invention uses a porous medium, used not for channeling the drops of oil entrained downwards by their weight according to its main scope, but to be crossed right through by the captured drops of oil, suctioned into a calm area. The advantages of such a principle of oil separation and recovery are in particular the following:

- it is possible to have large suction surfaces, corresponding to the extent of the porous medium or media, without requiring a speed increase in the calm areas, this by playing on the permeability of the porous media.
- The oil present in the porous medium is constantly subjected to a vacuum which suctions it into the calm area, and there is no longer a need to control the difficultly controllable coalescence phenomenon.
- With the oil being captured then suctioned without having to flow by gravity along a wall, there is less stress imposed on the main gas stream, responsible for the projection of the drops of oil onto an impact and capturing surface.
- The oil is entrained by a gas stream which crosses the porous medium wherein the oil is deposited, whereas in the prior art, the oil is transported to the porous medium by a gas stream, then it flows merely by gravity through the porous medium. This entrainment of the oil according to the invention particularly allows to increase the deposition efficiency of the oil in the porous medium.

According to one embodiment of the device purpose of the invention, it is provided that the intermediate area or areas of this device are intermediate chambers in each of which is transversely disposed an impactor and that each impactor comprises a porous medium of a generally planar appearance, and a closed volume placed behind the porous medium and connected to the calm vacuum area of oil recovery.

According to one embodiment of the invention, at least one impactor has a central portion and a peripheral portion, the central portion having a permeability to the gas stream that is substantially lower than that of the peripheral portion. The central portion and the peripheral portion are defined in a section transversal to the gas stream. Thus, the oil drops are deposited by impact onto the central portion, whereas the flow crossing the impactor is tangential to the main flow. Preferably, all the impactors have such a central portion and such peripheral portion.

In other words, the central portion captures drops of oil by their impact and their deposition, and the peripheral portion works in cross-flow filtration and the tangential flow recovers the oil flowing onto the central portion. This configuration of the impactor avoids overly reducing the output of the main gas stream flowing into the intermediate chamber with respect to the flow crossing the impactor.

In an alternative, the central portion is formed by a layer of low porosity, the permeability of the layer of low porosity with respect to the gas stream preferably representing less than 50% of the permeability of the rest of the porous medium. In other words, the central portion is less permeable than the peripheral portion, but the central portion and the peripheral portion belong to the porous medium. Thus, the porous medium has a large volume crossed by the flow, as the central portion also suctions part of the stream.

Alternatively, the central portion may comprise a solid wall, the peripheral portion being formed by the porous medium, the solid wall being preferably positioned against the downstream face of the porous medium. Thus, this arrangement is relatively simple to manufacture, as the porous medium can have a constant porosity, with a mere plate for forming the solid wall.

With the solid wall against the downstream face, not only are the drops of oil deposited on the central portion, but in the addition, the flow must pass in the upstream portion of the porous medium before tangentially flowing along the plate.

In the previous embodiment of the invention, the surface of said central portion represents between 20% and 90%, preferably between 30% and 70%, of the surface area of a cross section of the respective impactor. Thus, this proportion allows optimizing the output proportions between the stream crossing the porous medium and the main stream passing in the intermediate chamber.

According to one embodiment of the invention, at least one closed volume is juxtaposed with the calm area, the device comprising for example a is partition wall arranged in such a manner as to separate the respective closed volume from the calm area, the partition wall preserving at least one duct putting in fluid communication the respective closed volume and the calm area, said at least one duct being preferably located at the bottom of the closed volume.

Thus, the upstream compartment collects the drained oil on the transversal wall, which then flows downwards. Such a device is particularly compact, as the juxtaposition of the or each closed volume with the calm area reduces its size.

According to an alternative embodiment of the invention, the device further comprises at least one siphon and a discharge duct, each discharge duct being arranged so as to connect a respective siphon to the bottom of said at least one upstream compartment or to the bottom of said downstream compartment. With such a discharge duct and such a siphon allowing channeling the oil towards the cylinder head of the engine.

Preferably, the closed volume placed behind the porous medium is connected to the calm vacuum area of oil recovery by a duct going from a low point of said volume and advantageously extending on a side or on the underside of the device.

Thus, a device is obtained, which whereby its structure is similar in part to a known separator or decanter with impactors, but wherein the drops of oil captured by the porous medium of each impactor are transferred towards the volume located behind this impactor, then directed by a duct towards the area where the oil is recovered. The beginning of the aforementioned duct is advantageously located at the lowest point of the aforementioned volume in such a manner that all the captured oil goes into the duct. The porous medium, of generally planar appearance, may come in the form of a grid with sufficiently fine meshes, and relatively rigid, with a suitably adjusted permeability value, that is to say that is:

neither too permeable as all the gas stream would cross the porous medium and the area for recovering the oil would no longer be a calm area;

nor too impermeable, as the oil would no longer cross the porous medium.

This embodiment exhibits, compared with the known separators with impactors, the following specific advantages:

For a given effectiveness, the number of impactors may be reduced, going for example from three to two, whence a simplification and a space gain.

In contrast, for an available given volume, the efficiency of the device is improved.

The oil arriving on an impactor cannot bypass the latter, and all the gas suctioned into the recovery area is “filtered” by the crossing of the porous medium in contrary to known separators wherein the gas is suctioned by small holes without the drops contained in this gas being projected against the impactors.

In as far as the oil capture is carried out at the center of the device, the recovery is symmetrical with respect to the impactors, such that this recovery is carried out easily even for a flat engine, without requiring the currently used artifices: slanting of the bottom of the decanter, which reduces the useful volume of the latter, or double the oil recovery area with an area on each side of the impactors, thus complicating the device.

According to another embodiment of the device purpose of the invention, it is provided that the intermediate area of this device is constituted by the internal volume of a cyclone, whereas the calm vacuum area is a volume for storing the oil located on the side and/or below the cyclone, and that the porous medium forms the bottom of the cyclone and possibly a fraction or the totality of the lateral wall of said cyclone.

The invention may thus be applied to a cyclone separator, here too with the advantage of a significant increase of the efficiency/volume ratio. In addition, the solution purpose of the invention limits the constraints pertaining to the shape and particularly the proportions of the cyclones.

As regards the porous medium, it may be constituted of a metallic grid with intertwined or woven wires, this solution being applicable in particular to an oil decanter with impactors. The porous medium may also be made from a sintered metal powder or a thermoplastic powder base which is for example sintered or injected, this alternative solution being particularly applicable to a cyclone separator.

According to an embodiment of the invention, the porous medium comprises at least two juxtaposed layers of different permeabilities, for example a first relatively high permeability layer and a second relatively low permeability layer. In the present application, the term "juxtaposed" indicates layers which are adjoined or layers that are separated by a short distance, for example by an air film. Thus, the different permeability layers may filter particles of different sizes and nature.

The dimension of the meshes of the porous medium may be constant over the entire thickness of this porous medium, or differentiated with at least one first layer with wider meshing and at least one second layer with a narrower meshing. In the latter case, the first layer captures and retains the solid particles, whereas the second layer captures the oil particles while separating them from the gas.

Anyway, the invention will be better understood from the following description, with reference to the accompanying schematic drawing representing, by way of examples, a few embodiments of this device for the decantation of oil contained in a gas stream:

Figure 1:
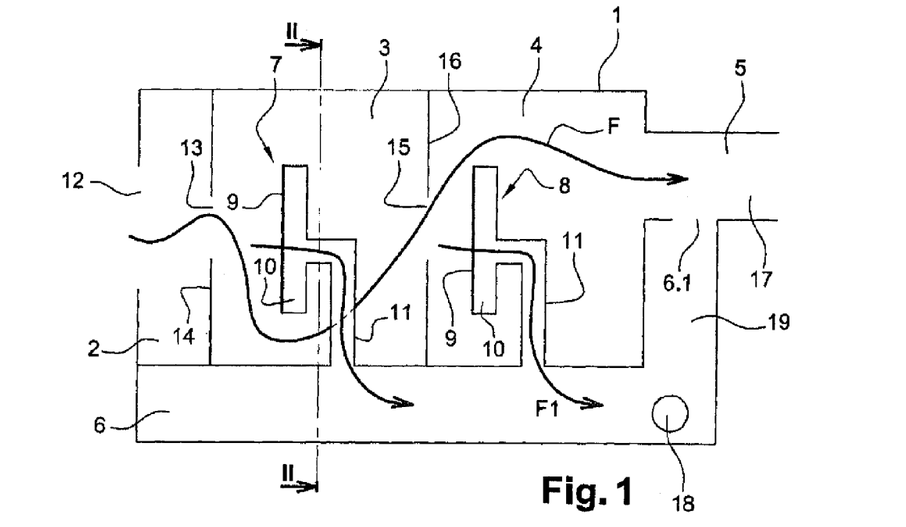
FIG. 1 is a longitudinal sectional view of a device in accordance with the invention, of decanter with impactors type.
Figure 2:
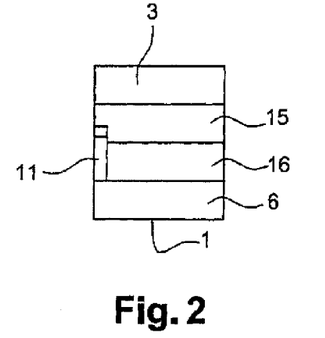
FIG. 2 is a cross-sectional view of the device of FIG. 1 according to line II-II, at an impactor.

By first referring to FIGS. 1 and 2, an oil decanter comprises, inside a same, more or less elongated body 1, an inlet chamber 2 for gases charged in oil, followed by several intermediate chambers, for example two intermediate chambers 3 and 4, and finally an outlet chamber 5. The decanter also comprises, disposed on one side of the aforementioned chambers 2 to 5, a chamber 6 for oil recovery.

In each intermediate chamber 3 or 4, is transversally disposed an impactor, respectively 7 or 8. Each impactor 7 or 8 comprises a porous medium 9 of generally planar appearance, and a relatively flat closed volume 10 placed immediately behind the porous medium 9.

The volume 10 is connected, by a short duct 11, to the oil recovery chamber 6. The duct 11, which goes from a low point of the volume 10, is represented as extending inside the intermediate chamber 3 or 4 to the basis thereof but could also, in a non illustrated alternative embodiment, be placed under the body 1 of the decanter.

The inlet chamber 2 comprises an inlet orifice 12 for the gases charged in oil. An inner communication orifice 13 is provided in the partition 14 separating the inlet chamber 2 from the first intermediate chamber 3. Another inner communication orifice 15 is provided in the partition 16 separating the first intermediate chamber 3 from the second intermediate chamber 4, the latter being in direct communication with the outlet chamber 5, which itself comprises an outlet orifice 17 for the exit of de-oiled gases.

The oil recovery chamber 6, in connection with the two impactors 7 and 8 by the respective ducts 11, comprises a hole 18 of oil recovery, preserved on its bottom. The anterior end of this oil recovery chamber 6 is in communication, by an area 19 extending transversally, with the outlet chamber 5. As FIG. 1 shows, the area 19 opens into the outlet orifice 17 by means of at least one pump-out orifice 6.1

Thus, in operation, a main gas stream schematized by the arrow F is established, crossing the successive chambers 2 to 5, whereas the communication created by the area 19 creates a vacuum inside the oil recovery chamber 6.

Figure 3:
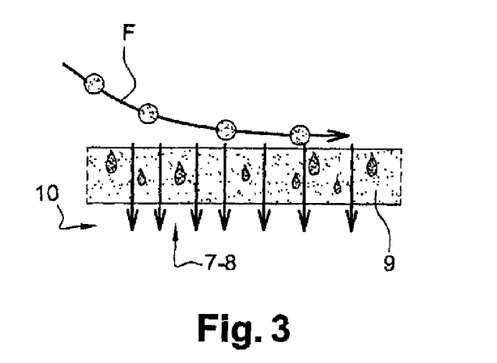
FIG. 3 is a partial sectional view of the porous medium, illustrating the oil separation principle.

This vacuum itself creates, by means of the ducts 11, a suction effect in the volumes 10 of the two impactors 7 and 8. The drops of oil contained in the gas stream F are thus suctioned through the porous medium 9, from the external face of this porous medium to the inside of the volume 10 which constitutes a calm area, as illustrated by FIG. 3.

Figure 4:
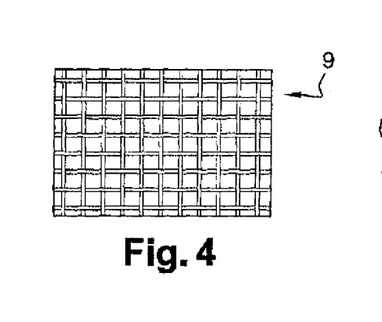
FIG. 4 represents a meshed structure of the porous medium usable in the device of FIGS. 1 and 2.
Figure 5:
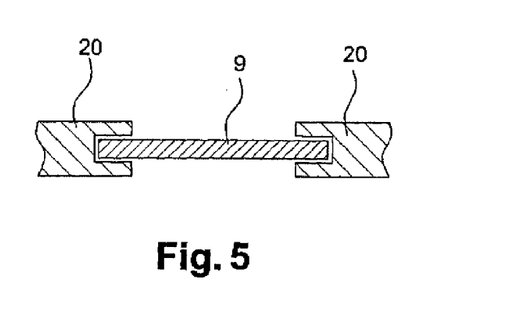
FIG. 5 illustrates the mounting of a grid able to have the structure of FIG. 4.

The porous medium 9 is achievable, as illustrated by FIG. 4, as a grid, the meshes of which must let large quantities of oil pass through. Thus, the meshes must be relatively wide, of dimensions typically ranging between 0.1 mm and 1 mm, while creating sufficient head loss so as not to suction all the gas stream. It particularly consists of a grid constituted of woven or braided metallic wires. As is illustrated by FIG. 5, the mounting of such a grid, here constituting the porous medium 9, is advantageously performed by inserting said grid between two slides 20 opposite one another, this mounting being achieved with a clearance, the order of magnitude of which corresponds to the dimension of the meshes of the grid. Such a mounting avoids having to resort to particular fastening members or to an overmolding technique, while allowing a possible replacement of the porous medium 9. However, the small solid particles that are captured and retained by the porous medium 9 must not block this large surface, porous medium during the service life of the related vehicle.

The drops of oil captured through the respective porous media 9 of the two impactors 7 and 8 are collected in the oil recovery chamber 6, and are finally discharged by the oil recovery hole 18. The secondary gas stream F1, suctioned with the oil in the volumes 10 and the oil recovery chamber 6, is brought towards the outlet chamber 5, hence towards the main stream F, by the communication area 19. The addition of the actions of the two impactors 7 and 8, disposed "in cascade", allows an efficient de-oiling without having to provide a greater number of impactors, thus contributing to the compactness of the embodiment described until now.

Figure 6:
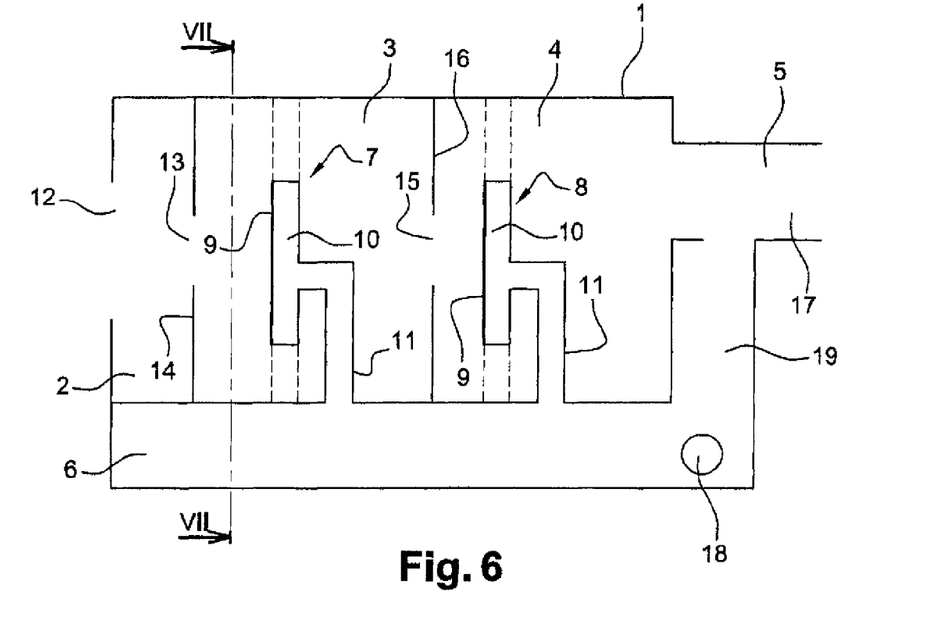
FIG. 6 is a longitudinal sectional view of a device of decanter with impactors type, constituting an alternative of the previous one.
Figure 7:
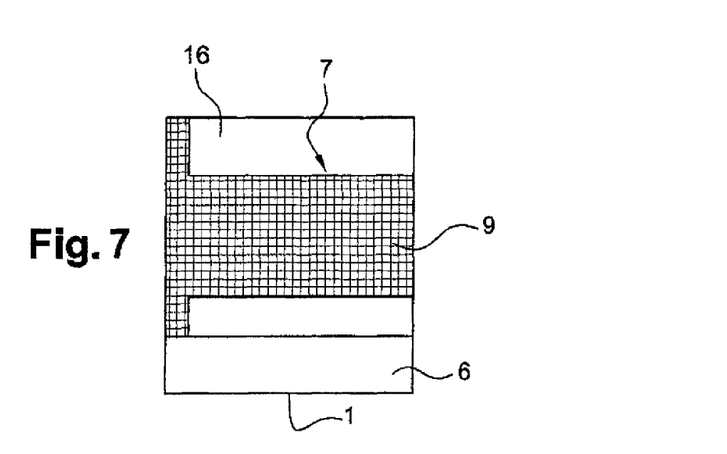
FIG. 7 is a cross-sectional view following the line VII-VII of FIG. 6, showing more particularly the shape of an impactor.

In an advantageous alternative embodiment, represented in FIGS. 6 and 7, each impactor 7 or 8, has, with its porous medium 9, an inverted "T" shape in such a manner that the oil arriving on the bottom of the impactor cannot bypass the latter. In other words, the low portion of each impactor 7 or 8 and its porous medium 9 occupies the entire width of the corresponding intermediate chamber 3 or 4, and thus acts as a "barrier" to the oil by capturing it.

With reference to FIGS. 8 to 11, it will now be described a cyclone separator implementing the invention.

Figure 8:
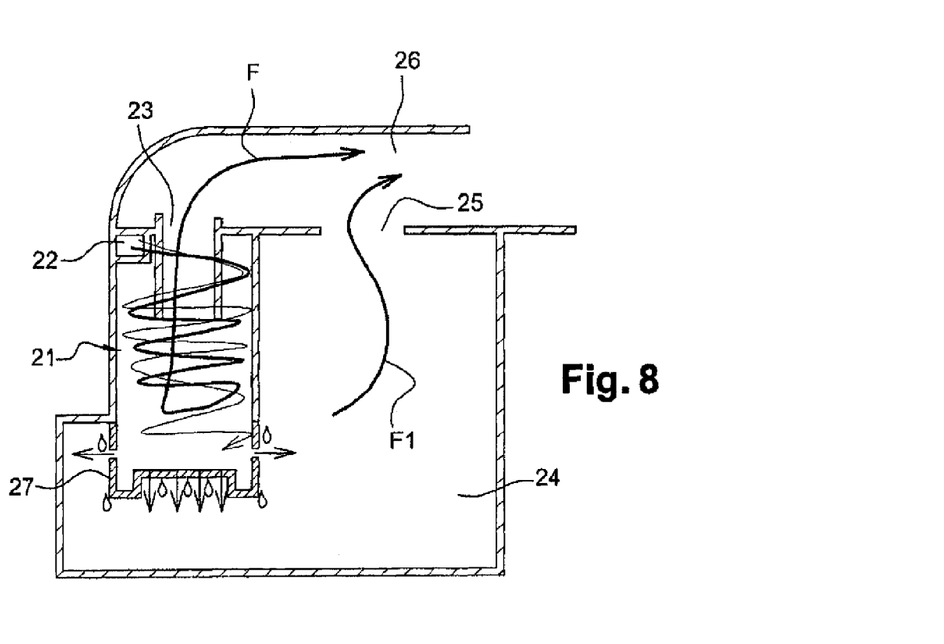
FIG. 8 is a vertical sectional view of a device in accordance with the present invention, of cyclone separator type.

In a known manner, the cyclone separator comprises a cyclone 21 of essentially cylindrical shape, with a tangential inlet 22 for the gases charged in oil, and with an axial outlet 23 for the de-oiled gases. The separator also comprises, on the side of the cyclone 21 and/or on the underside of this cyclone 21, a volume 24 for storing collected oil. The high portion of the volume 24 is in communication, by an orifice 25, with a gas outlet area 26 which horizontally extends the axial outlet 23 in such a manner as to create a vacuum in the volume 24 which constitutes a calm area for recovering and storing the oil separated from the main gas stream F.

Figures 9, 10:
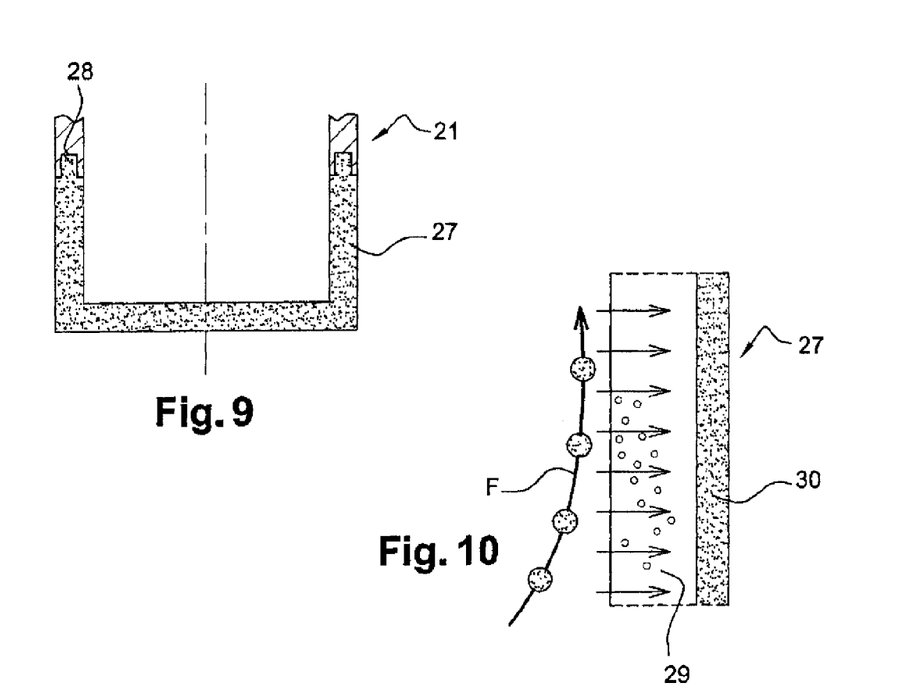
FIG. 9 shows the detail of the porous portion of the device of FIG. 8, by illustrating a mounting mode for this porous portion.
FIG. 10 is a partial sectional view of said porous portion, in a particular embodiment.

According to the invention, the bottom of the cyclone 21, and possibly also a fraction of its lateral wall are constituted by a porous portion 27, well visible on FIG. 9. The porous portion 27 may be assembled to the body of the cyclone 21 by being press-fitted or by overmolding, particularly by providing an annular groove 28 at the base of the cyclone 21 body.

The porous medium, here constituting the portion 27, must (in the case of a mounting by overmolding) have pores that are sufficiently small in order to avoid or at least highly limit the penetration of the overmolded material in the porous portion 27.

In operation, in an identical manner to the first embodiment, the porous medium allows suctioning the drops of oil, here at the base of the cyclone 21. The captured drops of oil cross the porous portion 27 and are collected in the volume 24. The fraction of gas entrained with the drops of oil, passes by the communication orifice 24 to join the main gas stream F again at the outlet chamber 26.

Here, the porous medium captures solid particles contained in the gas stream. This porous medium is advantageously constituted by a sintered metallic powder or by a sintered or injected thermoplastic powder, able to stop particles of a size less than 0.5 µm.

As FIG. 10 shows, the porous portion 27 may comprise an internal layer 29 with wide meshing, for example ranging between 2 and 5 µm, and an external layer 30 with a finer meshing, for example ranging between 0.1 and 0.5 µm. The small solid particles, typically of size smaller than 0.1 µm are captured by the internal layer 29 with wide meshing, due to the brownien motion. The oil particles larger and less sensitive to the brownien motion, are captured in the external layer 30 with finer meshing. The internal layer 29 is provided sufficiently thick to store the solid particles throughout the entire service life of the vehicle and its engine, in such a manner that the clogging of this internal layer 29 is not detrimental to the function of the cyclone separator.

The clogging capacity of the porous portion 27 by the solid particles may, if necessary, be improved with an increase in height, hence of the surface of the porous portion 27.

Of course, it may also be considered to replace the porous portion 27 or the entire cyclone, after a certain number of hours of use, in order to prevent excessive clogging.

Figure 11:
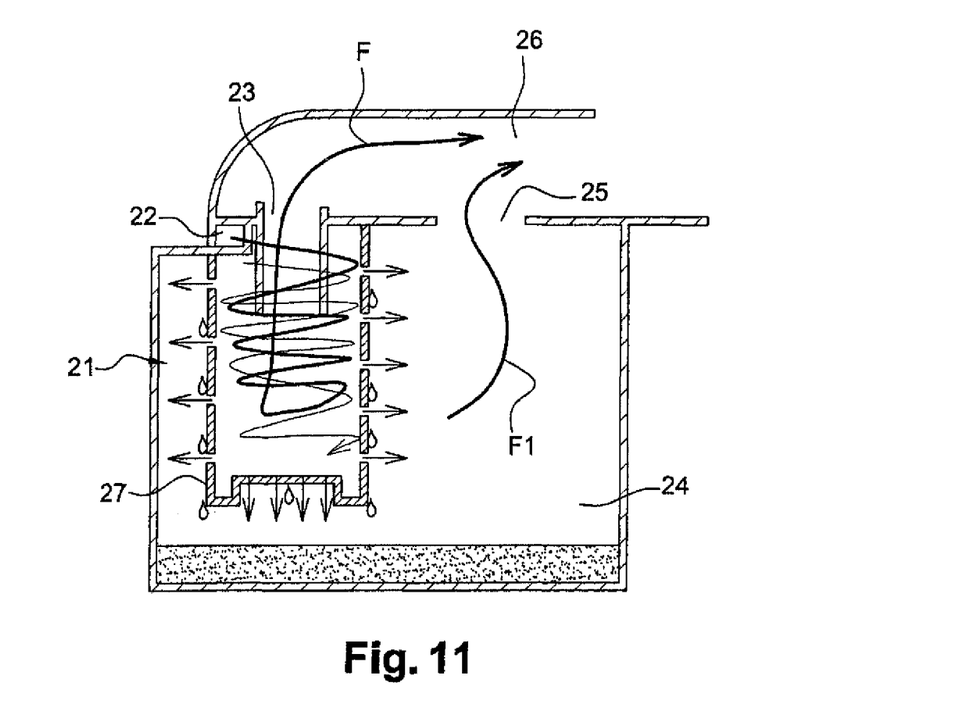
FIG. 11 is a vertical sectional view of a device of cyclone type, constituting an alternative of the previous one.

In an alternative embodiment represented on FIG. 11, the porous portion 27 not only constitutes the bottom of the cyclone 21 but also the totality of the lateral wall of this cyclone. The advantage of such an alternative embodiment is the decrease of the head loss, allowing having a greater gas output (secondary gas stream F1) passing by the calm area, namely the volume 24, without pulling-off of the captured oil drops. In fact total gas stream crossing the porous portion 27 is more important, but its speed remains low and especially homogenous, without local overspeed phenomena. A limited head loss in such a separator itself has for advantage to prevent to put under pressure the low portion of the engine, involving the risks of gasket displacement as well as gas leakage into the atmosphere.

Figure 12:
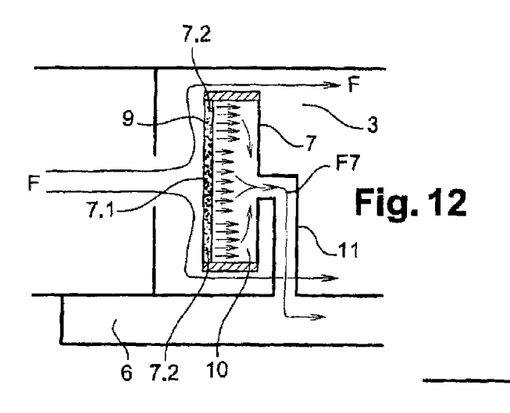
FIG. 12 is a vertical sectional view of a portion of a device in accordance with the present invention with impactors and in accordance with another particular embodiment.

FIG. 12 illustrates a portion of a device of decanter with impactors type which conforms to another alternative and which is similar to the device illustrated in FIG. 1 or 6, with the noteworthy exception of the differences mentioned hereinafter. The impactor 7 has a central portion 7.1 and a peripheral portion 7.2.

In service, the drops of oil may be deposited by impact on each central portion 7.1 and equivalent, whereas the gas stream F7 crossing the impactor 7 is tangential to the main stream F. This configuration of the impactor prevents overly reducing the output of the main gas stream flowing into the intermediate chamber, with respect to the flow crossing the impactor.

The central portion 7.1 has a permeability to the gas stream F substantially lower than the peripheral portion 7.2. The surface of the central portion 7.1 represents around 30% of the surface area of a transversal section of the impactor 7. In the configuration of FIG. 12, this proportion allows optimizing the distribution of the output of the gas stream F7 crossing the porous medium 9 and the main stream F passing into the intermediate chamber 3.

In the example of FIG. 12, the central portion 7.1 is formed by a layer of low porosity. The permeability of the layer of low porosity to the gas stream F here represents around 30% of the permeability of the rest of the porous medium 9.

Figure 13:
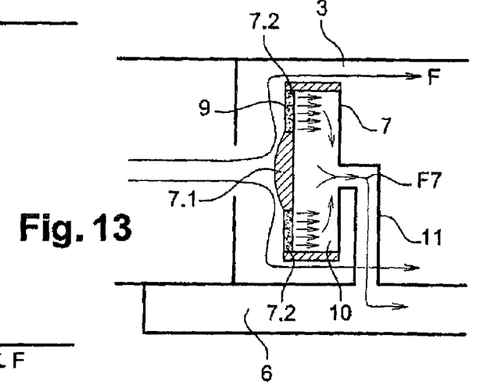
FIG. 13 is a view similar to FIG. 12 illustrating an alternative embodiment of FIG. 12.

In the alternative embodiment of FIG. 13, the central portion 7.1 comprises a solid wall. The peripheral portion 7.2 is formed by the porous medium 9 extending around the solid wall.

Figure 14:
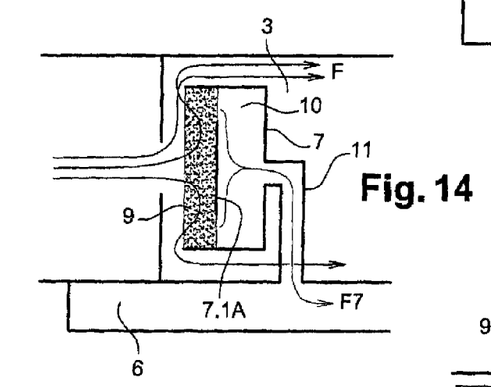
FIG. 14 is a view similar to FIG. 12 illustrating another alternative embodiment of FIG. 12.

In the alternative of FIG. 14, the solid wall 7.1A is placed against the downstream face of the porous medium 9. In service, the solid wall 7.1A deflects the gas stream F7 crossing the porous medium 9. In this alternative embodiment, the porous medium 9 is relatively thick and has planar faces. The porous medium 9 can have a constant permeability.

Figure 15:
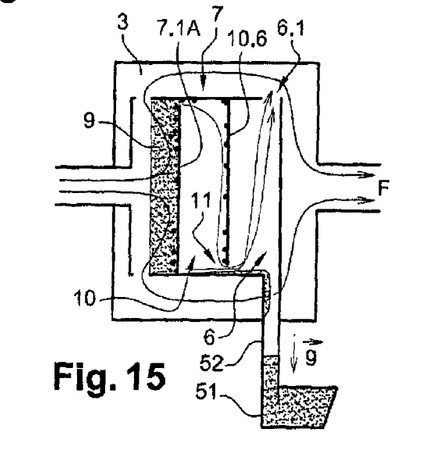
FIG. 15 is a view similar to FIG. 14 illustrating a particular embodiment of the alternative of FIG. 14.

FIG. 15 illustrates a portion of a device of decanter with impactors type, which is in accordance with another alternative embodiment and which is similar to the device illustrated in FIG. 1 or 6, with the notable exception of the differences mentioned hereinafter.

As that of FIG. 14, the device of FIG. 15 comprises a solid wall 7.1A which is placed against the downstream face of the porous medium 9.

Unlike the device in FIG. 14, the closed volume 10 is juxtaposed with the calm area 6. A partition wall 10.6 separates the closed volume 10 from the calm area 6. At the bottom of the partition wall 10.6, a duct 11 puts in fluid communication the closed volume 10 and the calm area 6.

At the bottom of the closed volume 10, drops of oil flowing by gravity g may gather on the partition wall 10.6. As in the device of FIG. 1 or 14, the calm area 6 has at least a pump-out orifice 6.1.

In service, as shown by FIG. 15, the closed volume 10 gathers oil that is drained on the partition wall 10.6 and which then flows towards the bottom of the closed volume 10 to the duct 11. The duct 11 allows the flowing of the stream that has crossed the porous medium 9.

Furthermore, the device of FIG. 15 comprises a siphon 51 and a discharge duct 52. The discharge duct 52 is here arranged in such a manner as to connect the respective siphon 51 to the bottom of the calm area 6. In service, the oil passes from the closed volume 10 into the calm area 6 by the duct 11, Then, the oil is discharged from the calm area 6 by the discharge duct 52, to be then channeled towards the cylinder head.

As it goes without saying, and as it results from what precedes, the invention is not limited to the sole embodiments of this device for the decantation of oil contained in a gas stream, described above, by way of examples, but it encompasses all the alternative embodiments and application alternatives complying with the same principle.

This is, particularly, how one would not depart from the framework of the invention:

by constructive modifications of the details, relating for example to the configuration of the various chambers and ducts in the case of an oil decanter with impactors, or the shape of the cyclone in the case of a cyclone separator;

In the case of an oil decanter with impactors, by providing more or less numerous impactors;

by making the porous medium by any material and with any appropriate texture, and by providing all permanent or removable mounting or fixing means, of this porous medium;

by not only applying such decanters or separators to produce oil separators housed under the cylinder head covers, but also to external oil separators, or even oil separators inserted on the Rankine loops, and more generally to all oil separators.

The invention claimed is:

1. A method for decanting oil contained in a gas stream by means of a device, the method providing for:
    circulating the gas stream containing oil to be separated between an inlet area and an outlet area of the device;
    arranging at least one intermediate area provided with at least one filter element for capturing drops of oil contained in the gas stream; and
    creating at least one calm area in which the oil is collected and discharged, after having been captured, the at least one calm area being subjected to a vacuum through a communication channel arranged between the at least one calm area and the outlet area,
    the device comprising a separation wall arranged to separate the at least one calm area from the or each intermediate area,
    wherein the gas stream is passed in contact with at least one porous medium, one face of which is in communication with the calm area, in such a manner that oil drops are captured by the porous medium and are suctioned through the porous medium to arrive in said calm area, and
    wherein the or each intermediate area defines at least one main gas stream passage configured for the flow of a main gas stream, and said at least one filter element defines at least one secondary gas stream passage configured for the flow of a secondary gas stream from the or each intermediate area towards said calm area, said at least one main gas stream passage being separate from said at least one secondary gas stream passage.

2. A device for decanting oil contained in a gas stream comprising:
    an inlet area for the gas stream containing oil to be separated;
    an outlet area for the de-oiled gas;
    at least one intermediate area provided with at least one filter element for capturing drops of oil contained in the gas stream;
    at least one calm area where the captured oil is collected and discharged;
    a separation wall arranged to separate the at least one calm area from the or each intermediate area; and
    a communication channel arranged between the at least one calm area and the outlet area, so as to subject the at least one calm area to a vacuum,
    wherein said at least one filter element comprises at least one porous medium placed at the interface between the or each intermediate area and the calm area, in such a manner that the drops of oil are captured by the porous medium and suctioned through the porous medium in order to arrive in said calm area, and
    wherein the or each intermediate area defines at least one main gas stream passage configured for the flow of a main gas stream, and said at least one filter element defines at least one secondary gas stream passage configured for the flow of a secondary gas stream from the or each intermediate area towards said calm area, said at least one main gas stream passage being separate from said at least one secondary gas stream passage.

3. The device according to claim 2, wherein
the intermediate area or areas are intermediate chambers in each of which is transversely disposed an impactor, wherein each impactor comprises a porous medium of a generally planar appearance, and a closed volume placed behind the porous medium and connected to the calm area of oil recovery.

4. The device according to claim 3, wherein
at least one impactor has a central portion and a peripheral portion, the central portion having a permeability to the gas stream that is substantially lower than that of the peripheral portion.

5. The device according to claim 4, wherein
the central portion is formed by a layer of low porosity, the permeability of the layer of low porosity with respect to the gas stream representing less than 50% of the permeability of the rest of the porous medium.

6. The device according to claim 4, wherein the central portion comprises a solid wall, the peripheral portion being formed by the porous medium, wherein the solid wall being placed against the downstream face of the porous medium.

7. The device according to claim 3, wherein at least one closed volume is arranged next to the calm area, the device comprising a partition wall arranged in such a manner as to separate the respective closed volume from the calm area, the partition wall preserving at least one duct putting in fluid communication the respective closed volume and the calm area, said at least one duct is located at the bottom of the closed volume.

8. The device according to claim 3, wherein the closed volume placed behind the porous medium is connected to the calm area of oil recovery by a duct, going from a low point of said closed volume and advantageously extending on a side or on the underside of the device.

9. The device according to claim 3, wherein the low portion of each impactor and its porous medium occupies the entire width of the corresponding intermediate chamber in such a manner that the oil arriving on the bottom of the impactor cannot bypass the latter.

10. The device according to claim 2, wherein the intermediate area is constituted by the internal volume of a cyclone, whereas the calm area is a volume for storing oil located on the side of the cyclone and/or below the cyclone, wherein the porous medium forms the bottom of the cyclone and possibly a fraction or totality of the lateral wall of said cyclone.

11. The device according to claim 2, wherein the porous medium is comprised of a metallic grid with intertwined wires, the wires being woven, knitted or braided, in the case of an oil decanter with impactors.

12. The device according to claim 2, wherein the porous medium is made from a sintered metal powder base, in the case of a cyclone separator.

13. The device according to claim 2, wherein the porous medium is composed of thermoplastic material.

14. The device according to claim 2, wherein the porous medium comprises unwoven fibers.

15. The device according to claim 2, wherein the porous medium comprises at least two juxtaposed layers of different permeabilities, a first relatively high permeability layer and a second relatively low permeability layer.

16. The device according to claim 2, wherein said at least one main gas stream passage extends around said at least one secondary gas stream passage.

17. The device according to claim 2, wherein said at least one filter element extends only partially across a cross-sectional area of a respective intermediate area.

* * * * *